United States Patent
Valentine et al.

[15] 3,637,265
[45] Jan. 25, 1972

[54] TRACK SLIDE ASSEMBLY FOR SNOWMOBILES

[72] Inventors: Louis A. Valentine, 11444 East 4th Way, Aurora, Colo. 80303; Henry L. Valentine, 1100 Toedtli Drive, Boulder, Colo. 80010

[73] Assignees: Louis A. Valentine, Aurora; Henry L. Valentine, Boulder, Colo.

[22] Filed: Feb. 2, 1970

[21] Appl. No.: 7,540

[52] U.S. Cl. ............................................305/24, 180/5 R
[51] Int. Cl. .................................................B62m 27/02
[58] Field of Search .............305/24, 25, 27, 35 EB, 38, 305/22; 180/5

[56] References Cited

UNITED STATES PATENTS

| | | | |
|---|---|---|---|
| 3,545,821 | 12/1970 | Erickson | 305/24 |
| 3,521,717 | 7/1970 | Coons | 180/5 |
| 3,362,492 | 1/1968 | Hansen | 305/27 |
| 2,339,886 | 1/1944 | Shannon | 180/5 |
| 3,309,150 | 3/1967 | Marier | 305/27 X |
| 3,485,312 | 12/1969 | Swenson | 305/24 X |

FOREIGN PATENTS OR APPLICATIONS

| | | | |
|---|---|---|---|
| 151,835 | 3/1932 | Switzerland | 305/27 |

*Primary Examiner*—Richard J. Johnson
*Attorney*—Van Valkenburgh and Lowe

[57] ABSTRACT

A track slide suspension for a snowmobile mounted between the forward drive wheels and the rearward idler wheels of the snowmobile drive track. This suspension includes longitudinally extended frame bars separated by transverse pivot bars. The frame bars are secured to any selected type of snowmobile by a proper arrangement of lugs fitted to mounting points on the snowmobile. The slide suspension includes forward and rearward pairs of skids carried on biased rocker arms so each pair of skids being independent of the other, will yield as the snowmobile travels over a rough snow surface.

11 Claims, 11 Drawing Figures

PATENTED JAN 25 1972

INVENTORS
LOUIS A. VALENTINE
HENRY L. VALENTINE

BY *Van Valkenburgh & Lowe*

ATTORNEYS

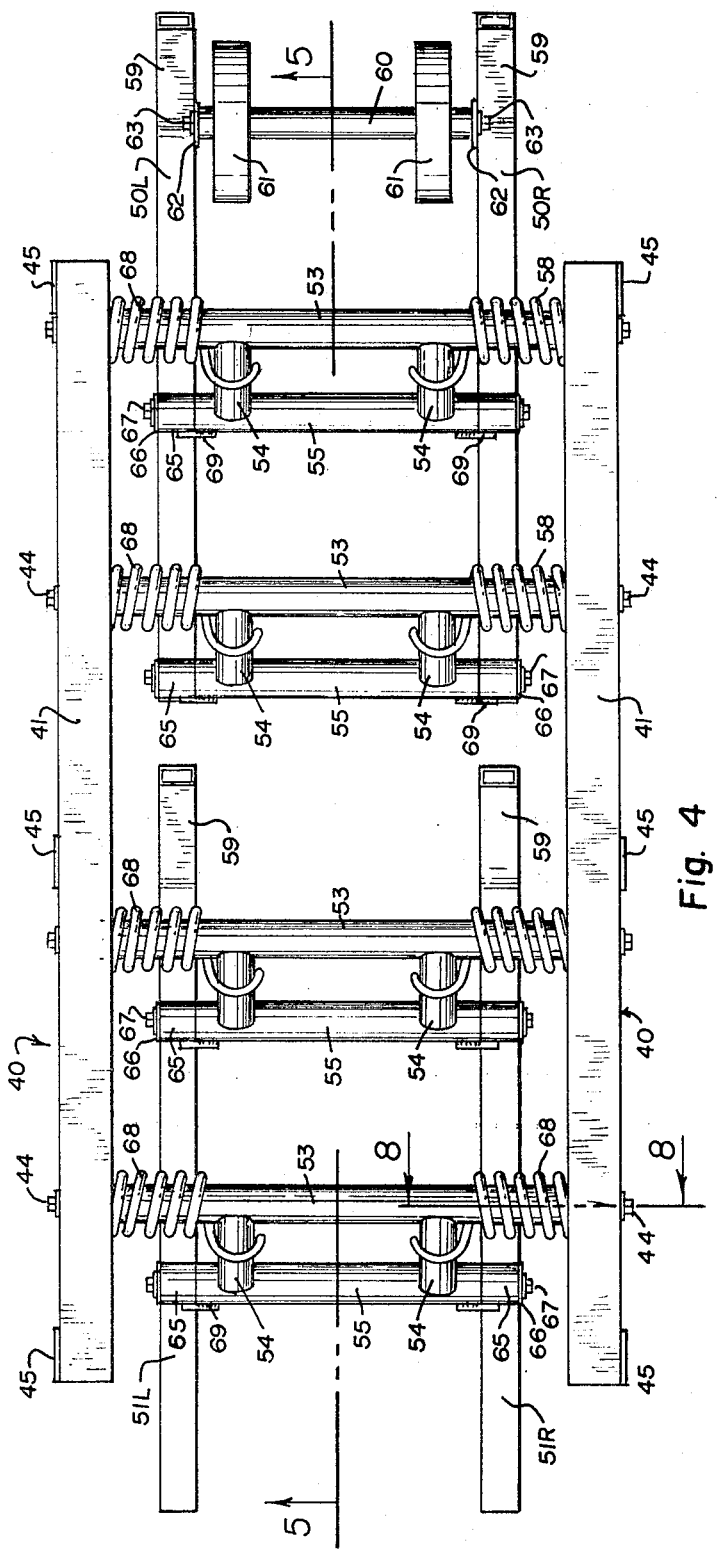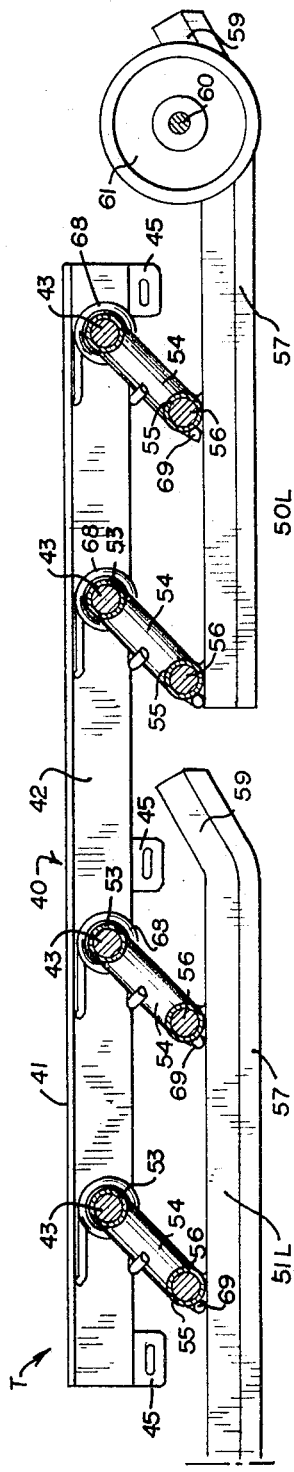

INVENTORS

LOUIS A. VALENTINE
HENRY L. VALENTINE

BY *Van Valkenburgh & Lowe*

ATTORNEYS

TRACK SLIDE ASSEMBLY FOR SNOWMOBILES

This invention relates to powered sleds, commonly called snowmobiles, and more particularly to improvements in the track slide suspensions for snowmobiles.

The various types of snowmobiles which are presently being marketed by a number of manufacturers are all similar in their basic arrangements, although they vary somewhat in size, appearance and power output. This basic arrangement consists of an elongated body having a cowl-covered engine at the forward end of this body. The passenger section, an elongated seat, is at the rearward section, behind the engine and the controls at the cowl. A pair of skilike sled runners support the forward end of the snowmobile and these runners rotate and swing to constitute a steering means, controlled by handle bars at the front of the passenger section. The snowmobile is driven by a track, a comparatively wide endless belt which extends underneath the body of the snowmobile behind the runners and is extended about forward drive wheels and rearward idler wheels. The reach of the track between the drive and idler wheels is mounted upon a supporting suspension assembly. This suspension assembly may be either an array of idler wheels or pair of track slides. The present invention concerns track slides and will thus be hereinafter referred to as a track slide or a track slide suspension.

By using lightweight but powerful two cycle engines, a snowmobile is capable of traversing a countryside at surprising speeds, sometimes in excess of 40 miles per hour. However, the operation of a snowmobile at such speeds can be hazardous because of irregularities of the snow surface such as the hummocks which are commonly referred to as moguls. Whenever a snowmobile hits a mogul at high speed, the resulting sudden uplift and the subsequent drop will cause the snowmobile to buck, sometimes in a violent manner and this bucking can cause the operator to lose control of the vehicle. The operator and passengers can even be thrown forwardly over the snowmobile in a manner which can cause an injury.

The present invention was conceived and developed with the above considerations in view and comprises, in essence, a track slide suspension having components which may articulate to permit the track to more easily flex in a vertical direction and to thus traverse moguls and similar hummocks of snow in a comparatively easy and smooth manner. The invention includes a resilient array of supporting arms carrying at least two sets of track slides in tandem to support the reach of the belt between the front and rear wheels. Either set of slides can yield independently of the other to flex upwardly and rearwardly whenever the track strikes and moves over a mogul.

It follows that a primary object of the invention is to provide a novel and improved track slide suspension for a snowmobile which will minimize the bouncing and bucking actions of the snowmobile as it is driven over moguls and similar irregularities of the snow surface.

Another object of the present invention is to provide a novel and improved track slide for a snowmobile which is easily mounted upon any of a number of different types and makes of snowmobiles.

Another object of the invention is to provide a novel and improved track slide for a snowmobile having a plurality of resiliently yieldable components arranged in tandem, and proportioned to better conform with the irregular snow surfaces commonly traversed by snowmobiles with a resulting improvement in load distribution, better traction and more effecting shock absorption and reduced bouncing of the snowmobile as it leaves a hummock or mogul.

Another object of the invention is to provide a novel and improved track slide suspension for a snowmobile which articulates in such a manner as to also help to stabilize the snowmobile against a lateral tipping and permits the snowmobile to be operated with a greater degree of safety at high speeds, and as such, is especially suitable for use with racer snowmobiles.

Other objects of the invention are to provide a novel and improved track slide suspension for a snowmobile which is a lightweight, low cost, reliable, rugged and durable unit.

With the foregoing and other objects in view, all of which more fully hereinafter appear, our invention comprises certain constructions, combinations and arrangements of parts and elements as hereinafter described, defined in the appended claims and illustrated in preferred embodiment by the accompanying drawing in which:

FIG. 4 is a top plan view of the track slide as taken from the indicated line 4—4 at FIG. 2, but on an enlarged scale.

FIG. 5 is a longitudinal sectional view as taken from the indicated line 5—5 at FIG. 4.

Figure 1:
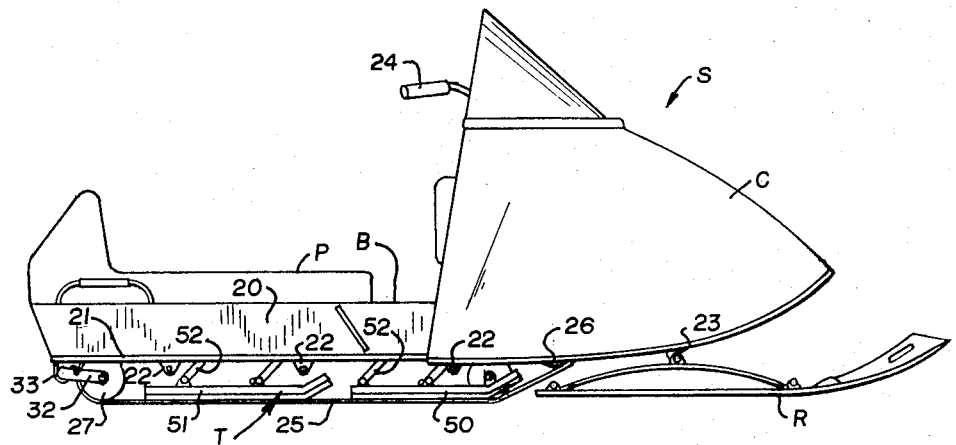
FIG. 1 is a side elevational view of a snowmobile having the improved track slide suspension mounted therein.
Figure 9:
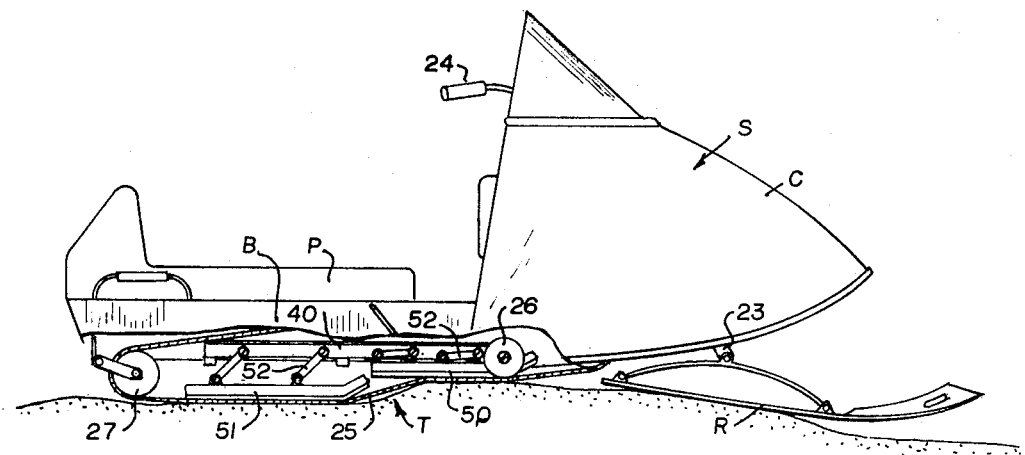
FIGS. 9 and 10 are side elevational views similar to the showing at FIG. 1, but indicating, in a somewhat diagrammatic manner, the action of the improved slide track assembly as the snowmobile moves over surface irregularities such as moguls.
Figure 10:
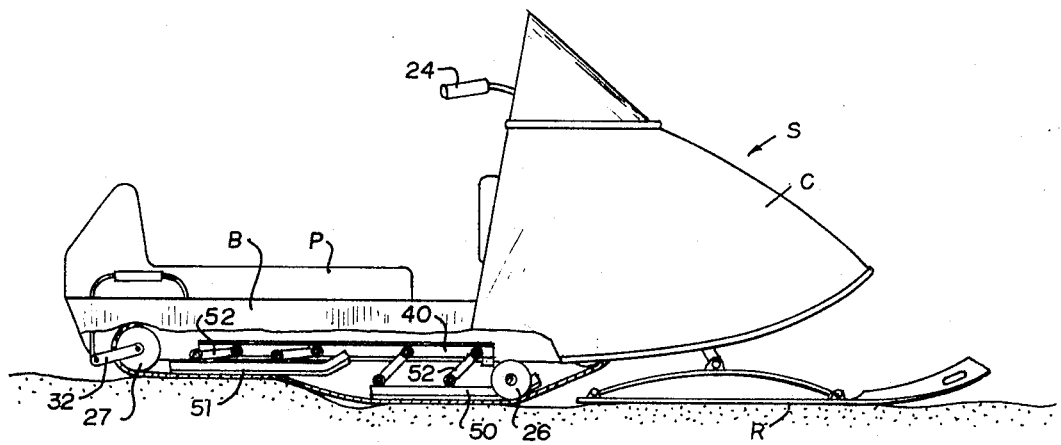

Referring more particularly to the drawing, the snowmobile S as shown at FIGS. 1, 9 and 10 consists of an elongated flat body B and a cowl C at the front of the body wherein the engine, gas tank and other controls, not shown, are housed. The body and cowl are metal plate members which are folded or otherwise formed into a rigid structure. The body portion behind the cowl is the drivers and passengers section and a seating pad P is provided for that purpose. The body B appears in section as an inverted "U" with side panels 20 each having a longitudinally extended foot support 21 and an array of depending ears 22 for holding the track slide T assembly as hereinafter described.

Ski runners R are mounted at the front of the snowmobile and carried upon resilient supports 23. The runners R are connected with a steering handle bar 24 at the rear of the cowl C. The construction of the resilient supports and the connection of the handle bars with the runners R is not shown in detail since both are conventional. The drive track 25 extends underneath the body behind the ski runners to support the snowmobile and this track, a comparatively wide endless belt, is stretched between front drive wheels 26, rear idler wheels 27 and the improved track slide suspension T in the reach between these wheels. The front drive wheels are positioned above the track slide T to slope the portion of the track 25 extending to the track slides as illustrated. These front drive wheels are carried upon a shaft 28 secured in bearings 29 mounted upon the body frame. A chain 30 extending from the motor within the cowl, not shown, connects with a sprocket on the drive wheel shaft 28 also not shown. The rear idler wheels are carried upon a shaft 31. This shaft is connected to the body by a resilient mount such as rocker arms 32 which are resiliently biased by coil springs 33, as illustrated, to permit the rear wheels to yield to changes in the vertical alignment of the belt supporting the snowmobile. This mechanism also has screws, not shown, to allow adjustment of track tension.

Figure 8:
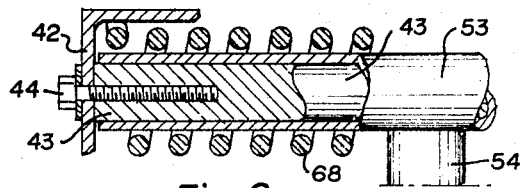
FIG. 8 is a fragmentary sectional detail as taken from the indicated line 8—8 at FIG. 4, but on an enlarged scale.
Figure 3:
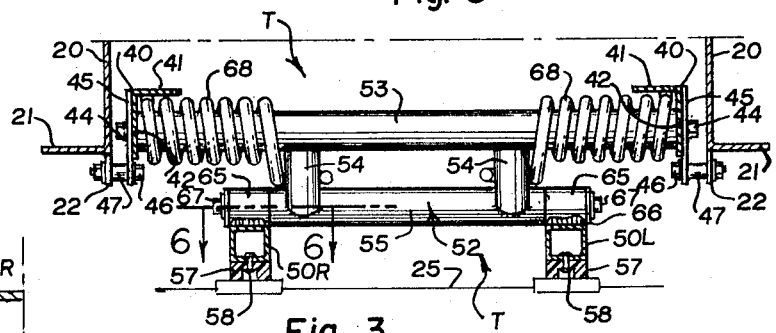
FIG. 3 is a transverse sectional view as taken from the indicated line 3—3 at FIG. 2, but on an enlarged scale.

The improved track slide assembly T is a longitudinally extended structure, symmetrical from each side of the longitudinal center of the snowmobile. It includes an upper framework 40 consisting of a pair of parallel angle members, each having an inturned upper flange 41 and a depending outward wall flange 42. These angle members are held apart by an array of transverse pivot bars 43 spaced to hold rocker arms as hereinafter described. Each end of each bar 48 abuts against the inner face of a wall flange 42 and is secured thereto by a bolt 44 extending through a hole in the flange 42 and into a tapped hole in the pivot bar 43 as best illustrated at FIG. 8.

This frame 40 is secured to the mounting bracket ears 22 on the side panels 20 of the snowmobile body B and the spacing between the wall flanges 42 is normally less than the spacing between opposing side panels 20 and bracket ears 22 of the various types of snowmobiles whereon the frame is mounted to thus permit the track slide to be fitted to any of the different types of snowmobiles. Side plate lugs 45 are welded to the wall flanges 42 with a lug being in alignment with each bracket ear 22. A mounting hole is provided in each lug 45 to register with a corresponding mounting hole in the aligned bracket ear 22 with the holes being at a position so that the track slide assembly will place the track slide members at their proper location for supporting the underreach of the track 25. A connective bolt 46 extends through each lug 45 and its aligned body ear 22. Tubular spacers 47, when required, are placed upon the bolts between the lugs and ears to securely and neatly position the track slide frame 40 at the center of the snowmobile.

The track slide includes a pair of forward skids 50L and 50R and a pair of rearward skids 51L and 51R. The skids of each pair are spaced apart in a symmetrical manner at a spacing less than that of the angle members of the frame 40 and these skids are held below the frame by rocker arm assemblies to contact the inner surface of the lower reach of the slide track 25. Each pair of skids is pivotally secured to a forward and rearward rocker arm assemblies 52, which swingably hang from pivot bars 43, in parallel and in a rearward inclination with respect to the pivot bars 43. Thus, each pair of skids will move upwardly and rearwardly by swinging rotation of its two rocker arm assemblies, but the skids will always remain in a horizontal position and in spaced parallelism with the track slide frame 40.

Each rocker arm assembly 52 is formed as an inverted U-shaped member having the legs thereof connected to an upper pivot tube 53 which, in turn, fits upon a pivot bar 43. This fit of tube 53 over the bar 43 is a free fit, with the length of the tube being only slightly less than the length of the bar 43. Thus, the rocker arm assembly and tube 53 may rotate upon the bar without binding or without any significant lateral end play. Each U-shaped rocker arm assembly 52 includes a pair of legs 54 which are welded to the pivot tube 53 at a spacing just within the spacing of the skid pairs 50L and 50R, or 51L and 51R, and the lower ends of these legs are welded to a lower pivot tube 55 which carries a shaft 56. The pivot tube 55 has a length corresponding to the leg spacing and the shaft 56 within it has a greater length, such that an end portion of the shaft will extend from each end of the pivot tube for connection with the skids as will be described.

Figure 2:
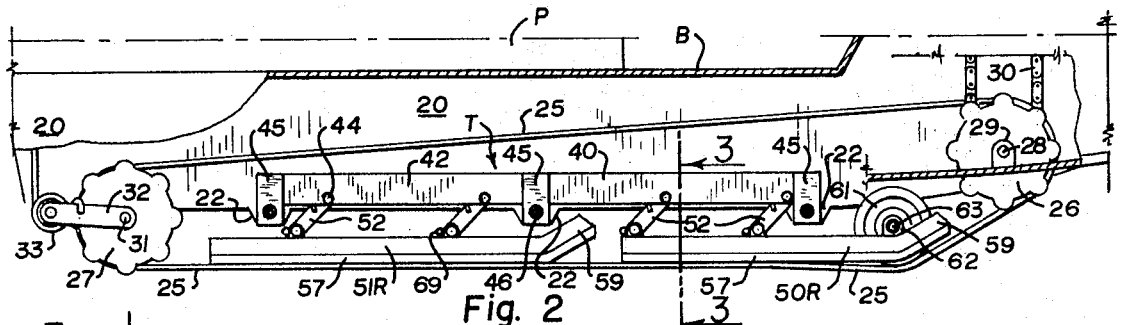
FIG. 2 is a fragmentary portion of the snowmobile shown at FIG. 1, on an enlarged scale and with portions of the snowmobile body broken away to better show a side elevation of the track slide.
Figure 7:
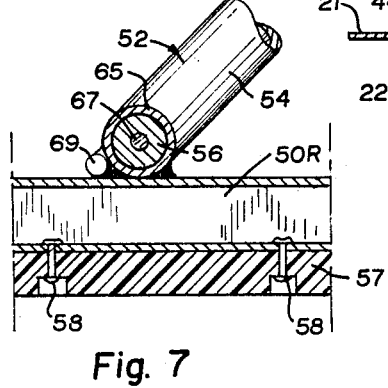
FIG. 7 is a fragmentary sectional detail as taken from the indicated line 7—7 at FIG. 6.

Each skid 50L, 50R and 51L and 51R is formed as a tubular member preferably square in section. An antifriction pad 57 of Nylon, Teflon or similar selected material is secured to the underside of each skid tube as by countersunk rivets 58, as shown at FIG. 7. The leading end of each skid is turned upwardly as at a toe 59 so that the track 25 moving thereunder will not catch upon a sharp leading edge of the skid. To further prevent any such catching, the forward ends of the forward pair of skids are interconnected by a transverse shaft 60 which carries a pair of idler wheels 61 between the skids to facilitate guiding the track from the drive wheels and underneath the skids, it being noted that the front drive wheels 26 are elevated above the reach of the track to provide an inclined leading portion of the track as heretofore mentioned. The idler wheel shaft 60 is secured to the forward skids 50R and 50L by brackets 62 welded to the inward face of the skids to upstand therefrom, and with the shaft being held in position by bolts 63 as best illustrated at FIGS. 2 and 4.

Figure 6:
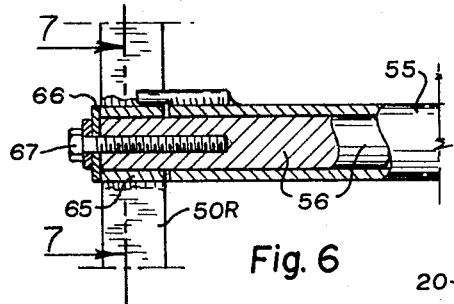
FIG. 6 is a fragmentary sectional detail as taken from the indicated line 6—6 at FIG. 3, but on a further enlarged scale.

The connection of each of the skids 50R, 50L, 51R and 51L to the pivot bars 56 is with bearing collars 65. A short tubular member forming the collar is welded to the upper surface of the skid at a proper location near the outer end and near the rear end of each skid as illustrated. These collars are sized to freely fit upon the projected ends of the pivot bars 56 so that the bars may rotate within the collar. The collars are retained upon their pivot bars 56 by washers 66, secured and held to the ends of the bars by bolts 67 threaded into tapped holes in the ends of the bars as best illustrated at FIG. 6.

Each pair of skids 50 and 51 underneath the frame 40 are attached to two spaced rocker arm assemblies 52 so that each pair of skids will remain in a parallel alignment with respect to the track slide frame 40 regardless of the position of the skid. These rocker arm assemblies thus support the weight of the snowmobile and they must be resiliently biased to remain in extended positions and not collapse. However, the rocker arms must yield to forces, more than that normally encountered, to permit a pair of skids to raise whenever the snowmobile is moving over a surface irregularity. To provide for such biased, yieldable movement, a comparatively heavy spring 68 is wound about each end of the upper pivot tube 53 with one end of the spring being abutted against the underside of the top flange 41 of the frame 40 and with the other end of the spring extending downwardly from the pivot tube 53 and hooked about the adjacent leg 54 of the rocker arm assembly. The several springs on the pivot bars are proportioned to effectively support the weight of the snowmobile and of the passengers riding it. Naturally, without any load upon the snowmobile, the pressure of the springs would force the arms to swing to an abnormal position. To prevent this, a stop 69 is provided at the base of each leg 54 to abut against the top of its respective skid whenever the leg is at a downwardly and rearwardly inclined position, approximately 45° from the vertical, although it was found that this angle could be varied from 30° to 60° from the vertical. It is to be noted that whenever an excess pressure, as from an irregularity in the snow surface over which the snowmobile moves, forces one pair of the skids to lift, the movement is both upwardly and rearwardly from the normal biased position. If the initial position of the arm is too steep, it was found that the legs 54 would pound the pivot tube 53.

FIGS. 9 and 10 depict the action of the improved slide track supports whenever a snowmobile moves over irregular surfaces. The forward and rearward skids swing independently of each other and their movements are combined with correlated but independent resilient movements of the ski runners R at the front of the snowmobile and of the idler wheels 27 at the rear. Accordingly, the snowmobile is, in effect, mounted upon four independently yieldable supports. When a snowmobile moves into a hummock or mogul, the resilient ski runner support 23 permits the skis to lift onto the hummock. A fraction of a second later the leading portion of the track 25 strikes this hummock. The front skids 50 are then pressured, by striking the hummock, to shift rearwardly and upwardly to move over the hummock while at the same time, the steering ski runners are moved beyond the hummock and drop to a different level in the snow surface. This is illustrated at FIG. 9 and when the skids are at the position illustrated at FIG. 9, a greater proportion of the weight of the snowmobile is upon these front skids 50. A fraction of a second later the snowmobile will move over the hummock to a point where the rear skids 51 encounter this hummock and there is a change of position where the rear skids 51 and the rear idler wheels are deflected upwardly while the forward skids drop back to their original position. The yielding action of each section of the track, supported by the skids 50 and 51 thus prevents to a very substantial extend any bucking action of the snowmobile, such as where the front end is thrust upwardly and a fraction of a second later, this front end drops downwardly while the rear of the snowmobile is thrust upwardly, a very undesirable action at high speeds.

Figure 11:
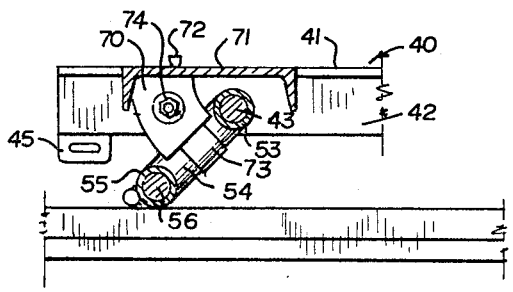
FIG. 11 is a fragmentary sectional detail similar to a portion of the showing at FIG. 5, but illustrating a modified construction of the resilient holding means of the unit.

FIG. 11 illustrates a modified construction of the track suspension wherein a resilient, rubberlike pad 70 is used to support the rocker arm 54 instead of the spring 68, heretofore described. A transverse structural member such as a channel 71 is extended across each structural angle 40 to provide an abutment for holding the pad 70. This pad 70 is formed as a pie-shaped member attached to the channel 71 by a pin 72 and to the rocker arm 54 by a clamp 73. The pad 70 will function in precisely the same manner as the spring 68 heretofore described, excepting that a squeeze bolt 74 may be extended through the body of the pad and may be tightened or loosened to change the stiffness of the pad. The pad may be of a natural rubber or of an elastomeric synthetic resin.

We have now described a preferred embodiment of our invention in considerable detail; however, it is obvious that others skilled in the art can devise and build alternate and equivalent constructions which are nevertheless within the spirit and scope of our invention. Hence, we desire that our protection be limited, not by the constructions illustrated and described, but only by the proper scope of the appended claims.

We claim:

1. The combination with a snowmobile having a drive track mounted between forward drive wheels and rearward idler wheels and a pair of longitudinally disposed frame members, one at each side of the track of a slide track assembly engaging the lower reach of the track between the drive and idler wheels comprising:
   A. a forward movable track slide component engaging the forward portion of the lower reach of the track;
   B. a rearward movable track slide component engaging the rearward portion of the lower reach of the tracks; and
   C. wherein each track slide component is movable independently of the movement of the other component and each track slide component comprises:
      a. a skid means engaging the lower reach of the track with the skid means of the forward component being spaced ahead of the skid means of the rearward component;
      b. a pivot means above the skid means carried by the aforesaid frame members;
      c. a rocker arm means connecting the pivot means with the skid means, to swing on the pivot means to move the skid means upwardly towards and downwardly away from said frame members, said rocker arm means including a front rocker arm and a rear rocker arm connecting with front and rear points on the skid means;
      d. a stop means adapted to limit the downward movement of the skid means to a position normally assumed by the lower reach of the track when the snowmobile is upon a flat surface and with said rocker arm means being then inclined downwardly and rearwardly with respect to the direction of snowmobile movement, whereby a swing of the rocker arm means to move the skid means upwardly towards the frame members is accompanied by a rearward movement of the skid means; and
      e. a resilient means associated with the skid means to bias the skid means downwardly toward the aforesaid limited position of downward movement but to permit the skid means to move upwardly and rearwardly whenever the snowmobile moves over a mogul or the like.

2. In the combination defined in claim 1, wherein said frame members comprise a pair of structural components disposed in spaced parallelism between the sidewalls of the snowmobile; the sidewalls of the snowmobile include mounting ears and said frame members include lugs adapted to be fitted to the mounting ears to properly position the frame members with respect to the snowmobile track.

3. In the organization defined in claim 1, wherein said stop means includes a lug on a rocker arm means of each skid means adapted to engage the skid means when the rocker arm means is inclined downwardly and rearwardly to place the skids at the aforesaid normal position at the lower reach of the track.

4. In the organization defined in claim 1, wherein each skid comprises a rigid body member having an antifriction pad at its undersurface to contact the upper surface of the lower reach of the track belt.

5. In the organization defined in claim 1, wherein each skid has an upturned leading end.

6. In the organization defined in claim 1, wherein said resilient means comprises coil springs, biased to push the rocker arm means downwardly from the frame members to normally engage the stop means.

7. In the organization defined in claim 1, wherein said pivot means comprises bars mounted transversely between the frame members, each of said skid means comprises a skid at each side of the center axis of the track and said rocker arm means comprises a bearing member pivotally secured to each bar, an arm secured to the bearing member to normally extend downwardly and rearwardly therefrom, and a bearing at the base of the arm adapted to pivotally connect with a skid means member.

8. In the organization defined in claim 1, wherein:
   said stop means limits the downward movement of the skid means to a position where the inclination of the rocker arm means is between 30° and 60° with respect to the longitudinal axis of the frame member.

9. In the combination defined in claim 1, wherein:
   the pivot means of each track slide component includes a front transverse bar mounted between the frame members and pivotally carrying the front rocker arm and a rear transverse bar mounted between the frame members and pivotally carrying the rear rocker arm;
   and wherein the spacing between the front and rear transverse bars is the same as the spacing between the front and rear connection points of the rocker arms to the skid means;
   and wherein the front and rear rocker arms are each of the same length, whereby to provide a parallelogram linkage to hold the skid means in the same longitudinal alignment at all positions.

10. In the combination defined in claim 9, wherein
    each rocker arm means includes a sleeve about its pivot means bar, a pair of laterally spaced, parallel arms swingably depending from the sleeve and a transversely disposed shaft means at the base of the arms; and
    wherein each skid means comprises a pair of laterally spaced, longitudinally disposed skids, each connecting with the aforesaid shaft means.

11. In the organization defined in claim 10, wherein
    the arms are spaced apart on the sleeve symmetrically from each side of the longitudinal center axis of the assembly;
    the shaft means held by the arms includes an end projecting from each side of the arms; and
    the skids include bearings engaging the projecting ends.

* * * * *